US012703655B2

(12) United States Patent
Campion et al.

(10) Patent No.: US 12,703,655 B2
(45) Date of Patent: Aug. 11, 2026

(54) TITANIA-SILICA GLASS WITH UNIFORM HYDROXYL CONCENTRATION

(71) Applicant: CORNING INCORPORATED, Corning, NY (US)

(72) Inventors: Michael John Campion, Corning, NY (US); Sergey Nikolaevich Shubin, Espoo (FI); Pushkar Tandon, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 175 days.

(21) Appl. No.: 18/411,231

(22) Filed: Jan. 12, 2024

(65) Prior Publication Data

US 2024/0246850 A1 Jul. 25, 2024

Related U.S. Application Data

(60) Provisional application No. 63/440,718, filed on Jan. 24, 2023.

(30) Foreign Application Priority Data

Feb. 21, 2023 (NL) ..................................... 2034196

(51) Int. Cl.

| | |
|---|---|
| ***C03B 19/14*** | (2006.01) |
| ***C03B 19/06*** | (2006.01) |
| ***C03C 3/06*** | (2006.01) |

(52) U.S. Cl.

CPC ........ *C03B 19/1453* (2013.01); *C03B 19/066* (2013.01); *C03B 2201/075* (2013.01);

(Continued)

(58) Field of Classification Search

CPC . C03C 2201/42; C03C 2203/52; C03B 19/01; C03B 19/1453; C03B 19/066

See application file for complete search history.

(56) References Cited

U.S. PATENT DOCUMENTS 5,086,352 A 2/1992 Yamagata et al.
10,017,413 B2 * 7/2018 Annamalai ............... C03C 3/06

(Continued)

FOREIGN PATENT DOCUMENTS

CN 106430912 A * 2/2017 ......... C03B 19/1453
EP 2145865 A1 1/2010

(Continued)

OTHER PUBLICATIONS

K.M. Davis, et al, "Quantitative infrared spectroscopic measurement of hydroxyl concentration in silica glass," J. Non-Crystalline Solids, 203 (1996), pp. 27-36.

(Continued)

*Primary Examiner* — Erin Snelting
*Assistant Examiner* — Steven S Lee
(74) *Attorney, Agent, or Firm* — Amy T. Lang

(57) ABSTRACT

A process of forming a titania-silica glass body, the process including exposing a titania-doped silica soot body to a first thermal treatment by heating the body to a first temperature T1 between about 800° C. and about 1100° C. for a first time duration t1 calculated using the equation:

$$t1 > \frac{L_c^2}{4\alpha},$$

wherein $L_c$ is the characteristic length (cm) of the body and α is the thermal diffusivity (cm$^2$/sec) of the body. The process further including exposing the body to a second thermal treatment by heating the body to a second temperature T2 between about 1050° C. and about 1250° C. wherein, after the second thermal treatment, a peak-to-valley differ- (Continued)

ence of hydroxyl concentration amongst a plurality of segments of the body is about 70 ppm or less.

19 Claims, 7 Drawing Sheets

(52) U.S. Cl.
CPC ............ *C03B 2201/42* (2013.01); *C03C 3/06* (2013.01); *C03C 2203/52* (2013.01)

(56) References Cited

U.S. PATENT DOCUMENTS

2007/0134566 A1* 6/2007 Maida ....................... G03F 1/60 65/17.2
2008/0305941 A1* 12/2008 Maida .................. C03C 4/0085 501/54
2010/0003609 A1 1/2010 Maida et al.
2010/0317505 A1* 12/2010 Koike ................. C03B 19/1453 501/54
2011/0207592 A1* 8/2011 Duran ................. C03B 19/1415 501/54
2016/0137545 A1* 5/2016 Annamalai ............. C03C 3/076 501/54
2016/0236965 A1* 8/2016 Annamalai ............. C03B 19/12

FOREIGN PATENT DOCUMENTS

JP 2013241336 A * 12/2013
WO WO-2013084978 A1 * 6/2013 ......... C03B 23/0006
WO WO-2016081420 A1 * 5/2016 ............. C03B 19/06

OTHER PUBLICATIONS

NL Search Report, 2034196, dated Aug. 25, 2023, 8 pages.

* cited by examiner

TITANIA-SILICA GLASS WITH UNIFORM HYDROXYL CONCENTRATION

This application claims the benefit of priority to Dutch Patent Application No. 2034196 filed on Feb. 21, 2023, which claims the benefit of priority of U.S. Provisional Application Ser. No. 63/440,718 filed on Jan. 24, 2023, the content of which is relied upon and incorporated herein by reference in its entirety.

FIELD

The present disclosure is directed to a silica-titania glass with uniform hydroxyl concentration. The glass article may be suitable for use in extreme ultraviolet lithography applications.

BACKGROUND

Extreme ultraviolet (EUV) lithography uses optics to illuminate, project, and reduce pattern images to form integrated circuit patterns. The use of extreme ultraviolet radiation is beneficial in that smaller integrated circuit features can be achieved. The optics for EUV lithography are currently made from low thermal expansion glass, such as silica-titania glass. The glass is traditionally made by a flame hydrolysis process in which high purity precursors are injected into flames to form fine glass particles that are then deposited onto a glass body.

In EUV lithography systems, the glass is typically coated with a reflective surface to form a reflective mirror. Furthermore, the glass, in an EUV lithography system, must be able to meet stringent thermal expansion requirements in the system. Specifically, the glass must be able to maintain its surface shape (known as "figure") when subject to temperature changes in the system. A temperature stable glass is necessary to avoid any induced distortions in the wavefront characteristics of EUV projection optics.

SUMMARY

Embodiments of the present disclosure comprise methods to produce glass bodies that are able to advantageously maintain their figure during operation of an EUV lithography system. Therefore, the glass bodies, according to the embodiments of the present disclosure, reduce or prevent any wavefront characteristics of EUV projection optics.

According to a first embodiment, the present disclosure is directed to a process of forming a titania-silica glass body, the process comprising exposing a titania-doped silica soot body to a first thermal treatment by heating the body to a first temperature T1 between about 800° C. and about 1100° C. for a first time duration t1 calculated using the equation:

$$t1 > \frac{L_c^2}{4\alpha},$$

wherein $L_c$ is the characteristic length (cm) of the body and $\alpha$ is the thermal diffusivity (cm$^2$/sec) of the body. The process further comprising exposing the body to a second thermal treatment by heating the body to a second temperature T2 between about 1050° C. and about 1250° C. for a second duration t2 wherein, after the second thermal treatment, a peak-to-valley difference of hydroxyl concentration amongst a plurality of segments of the body is about 70 ppm or less, the hydroxyl concentration being measured using a Fourier transform infrared spectroscopy in transmission, and the plurality of segments includes every adjacent segment across a length and a width of the body, the length being about 25 mm or more and the width being about 25 mm or more.

According to a second embodiment, the present disclosure is directed to a process of forming a titania-silica glass body, the process comprising exposing a titania-doped silica soot body to a first thermal treatment by heating the body to a first temperature T1 between about 800° C. and about 1100° C. for a first time duration t1 calculated using the equation:

$$t1 > \frac{L_c^2}{4\alpha},$$

wherein $L_c$ is the characteristic length (cm) of the body and $\alpha$ is the thermal diffusivity (cm$^2$/sec) of the body. The process further comprising exposing the body to a second thermal treatment by heating the body to a second temperature T2 between about 1050° C. and about 1250° C. for a second duration t2 and increasing the temperature of the body from the first temperature T1 to a second temperature T2 at a rate of about 20° C./hour or greater.

BRIEF DESCRIPTION OF THE DRAWINGS

While the specification concludes with claims particularly pointing out and distinctly claiming the subject matter of the description, it is believed that the description will be better understood from the following specification when taken in conjunction with the accompanying drawings.

DETAILED DISCLOSURE

As used herein, "ppm" means parts per million by weight.

As used herein, "atm" means atmosphere.

Figure 1:
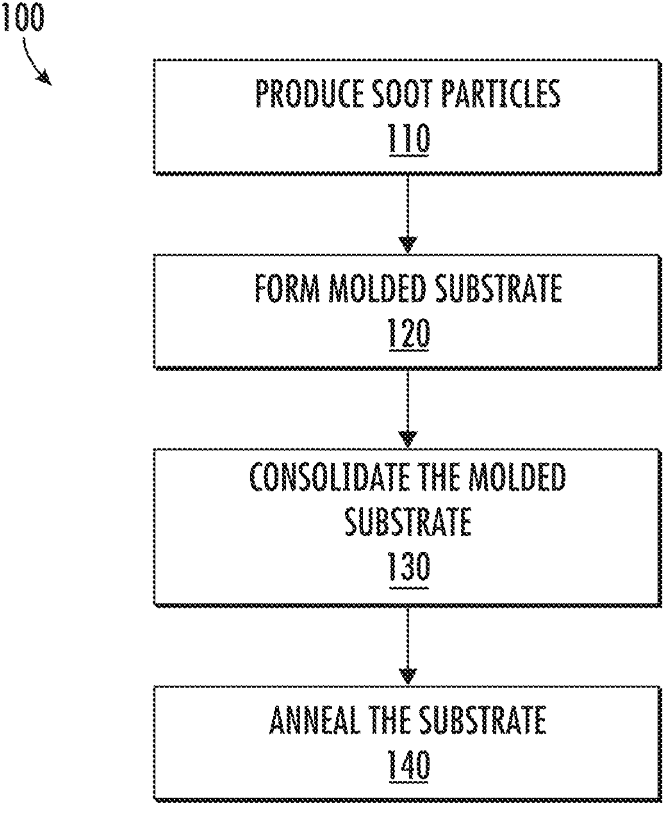
FIG. 1 is a flowchart of a process of forming a glass body, according to embodiments disclosed herein.

FIG. 1 depicts a process 100 to produce a titania ($TiO_2$) glass body suitable for use in EUV lithography applications. As discussed further below, the produced glass has uniform hydroxyl (OH) concentrations across the body. Because thermal expansion properties depend on hydroxyl concentration, a uniform distribution of hydroxyl is necessary to achieve a uniform thermal expansion across the glass body. Having a uniform thermal expansion across the glass body allows the glass body to not expand when exposed to different temperature environments, which is beneficial in, for example, lithography applications. Therefore, the body disclosed herein is suitable for use in, for example, EUV lithography applications. The glass may be Ultra Low Expansion glass (ULE® Glass) manufactured by Corning Incorporated.

EUV lithography technology relies on an optical projection system to expose a reflective photomask with EUV light, such that light reflected from the photomask is directed to a thin photosensitive layer deposited on the surface of a semiconductor wafer. This technique is commonly used in the semiconductor device production process. EUV lithography systems operate at a wavelength of light of about 13.5 nm. This extremely short wavelength poses a number of challenges to the design of the EUV systems. For example, reflective coatings on the mirror bodies in EUV systems are not able to reflect all of the light with such a low wavelength. About thirty percent of the light is absorbed by the reflective coatings, rather than reflected. The absorbed light produces undesirable heat in the mirror body, causing the mirror body to thermally expand or contract. Such changes in the mirror body can in turn cause the reflective coating, on the mirror body, to deform, which leads to distortions in the wavefront of the reflected light. Wavefront distortions may lead to deterioration in the resolution of the EUV system and errors in the patterns formed on the photosensitive layer.

Thus, the mirror bodies must be able to maintain their shape and figure even when subjected to the demanding thermal loads of EUV systems. Silica-titania glass, such as ULE® glass, is presently the material of choice for mirror bodies in EUV systems.

It has also recently been shown that higher levels of uniformity in the silica-titania glass reduce any expansion or contraction of the glass in an EUV system. More specifically, with such higher levels of uniformity, the glass maintains its overall figure when subject to temperature changes in the EUV system. Embodiments of the present disclosure are directed to producing glass bodies with such uniformity. In particular, embodiments of the present disclosure are directed to producing glass bodies with uniform hydroxyl concentrations.

Figure 2A:
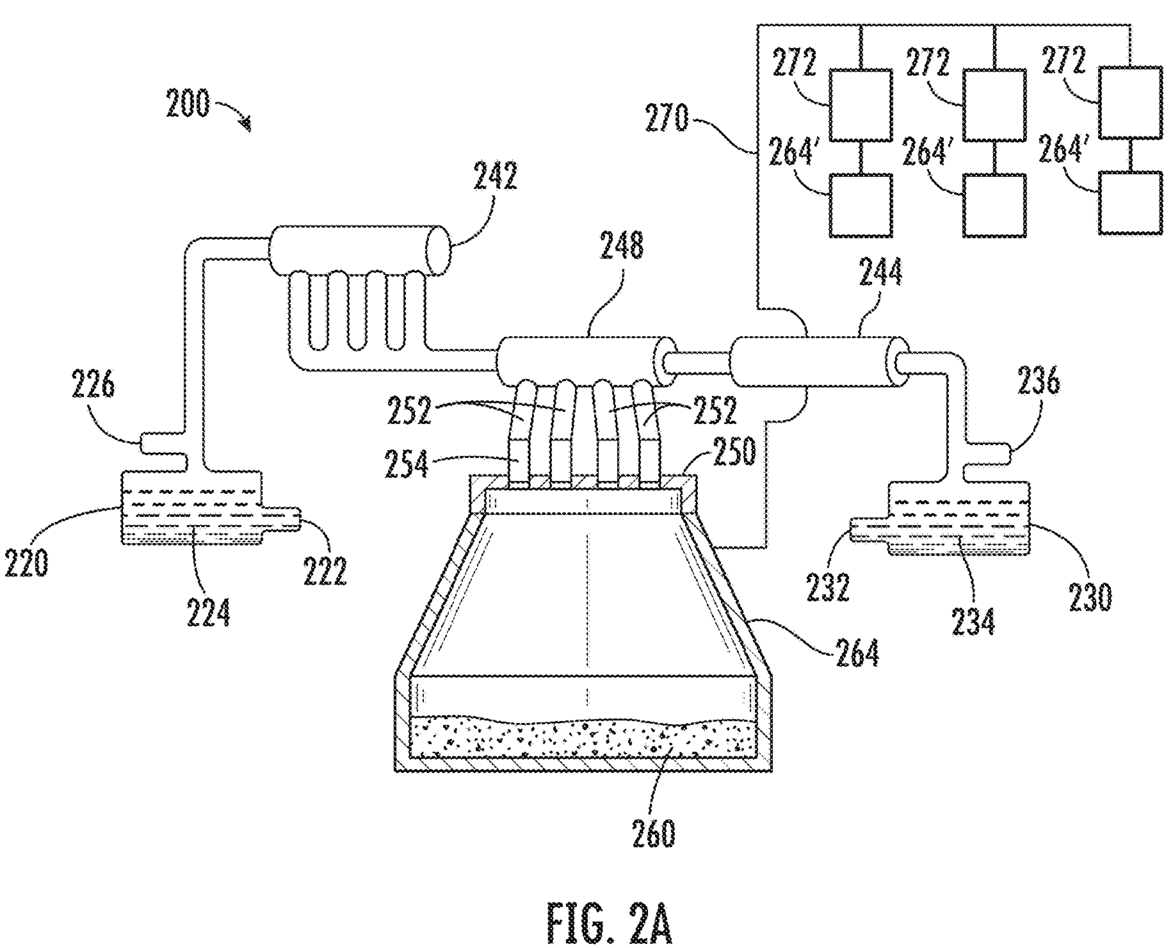
FIG. 2A is a schematic illustration of a system to produce loose soot particles in the process of FIG. 1, according to the embodiments disclosed herein.

With reference to FIG. 1, step 110 of process 100 comprises the production of soot particles. More specifically, step 110 comprises forming the soot particles as loose soot particles and then collecting the loose soot particles. FIG. 2 depicts a schematic representation of a system 200 to produce the loose soot particles using a chemical vapor deposition process. As shown in FIG. 2, system 200 comprises a first reservoir 220 that houses a silica precursor 224 and a second reservoir 230 that houses a titania precursor 234. First reservoir 220 includes an inlet 222 for introduction of a carrier gas, such as nitrogen, at or near the base of the reservoir. The carrier gas forms a vaporous stream with the silica precursor 224. Similarly, second reservoir 230 includes an inlet 232 for introduction of a carrier gas, such as nitrogen, at or near the base of the reservoir. The carrier gas in second reservoir 230 forms a vaporous stream with the titania precursor 234.

The silica precursor 224 may comprise, for example, $SiCl_4$ and/or octamethylcyclotetrasiloxane (OMCTS). The titania precursor 234 may comprise, for example, $TiCl_4$, titanium isopropoxide (TPT), titanium tetraisopropoxide (TTIP), and/or tetraisopropyltitanate (TIPT).

Bypass streams of carrier gas are also introduced into system 200 at inlets 226 and 236 to prevent saturation of the vaporous silica stream and the vaporous titania stream. The vaporous silica stream then passes through distribution system 242 to manifold 248, and the vaporous titania stream passes through distribution system 244 to manifold 248.

The silica and titania vaporous streams then mix in manifold 248 to form a mixture of the two streams. As further shown in FIG. 2, the mixture of the two streams flows to furnace 250. More specifically, the mixture of the two streams passes through fume lines 252 to burners 254 mounted in an upper portion of furnace 250. The two streams are further joined with a fuel/oxygen mixture at burners 254 to combust and oxidize the mixture. The fuel may be natural gas. The oxidation and combustion of the mixture forms loose soot particles 260, which are cooled and directed into collection chamber 264. Soot particles 260 comprise silicon dioxide and titanium dioxide. More specifically, the silicon dioxide and titanium dioxide in the particles mix at the atomic level to form Si—O—Ti bonds.

In some embodiments, soot particles 260 are directed upward through a tube 270 rather than downward into collection chamber 264. Tube 270 may be a quartz tube, which carries soot particles 260 in a vaporous stream to one or more filter bags 272. The soot particles 260 are removed from the vaporous stream by the filter bags 272 and are then deposited into one or more collection chambers 264'. For example, the soot particles 260 fall downward from filter bags 272 and into collection chambers 264'. A pulse of $N_2$ may periodically be applied to filter bags 272 to prevent the excess accumulation of soot particles 260 on the bags. In some embodiments, collection chambers 264' are stainless steel hoppers. The soot particles 260 can then be further collected from collection chambers 264' and deposited into barrels, where soot particles 260 may be stored until further use.

The produced soot particles 260 are spherical in shape with substantially uniform distributions of $SiO_2$ and $TiO_2$ within the particles. In addition to $SiO_2$ and $TiO_2$, the composition of soot particles 260 may also comprise CO and $CO_2$, which may be incorporated into the particles due to the fuel at burners 254. The size of each soot particle 260 may vary depending on the conditions of burners 254, but in general, soot particles 260 have an average diameter of about 20 nm to about 500 nm, or about 50 nm to about 400 nm, or about 60 nm to about 300 nm, or about 50 nm to about 100 nm.

Soot particles 260 may cool to about 200° C. or less, or about 175° C. or less, or about 150° C. or less, or about 125° C. or less, or about 100° C. or less, or about 75° C. or less, or about 50° C. or less, or about 25° C. or less, or about 20° C. or less before reaching collection chambers 264, 264'.

With reference again to FIG. 1, at step 120 of process 100, soot particles 60 are removed from collection chambers 264, 264' and deposited into a mold to form a pressed and molded body, which has a density of about 0.50 $g/cm^3$ or greater, or about 0.55 $g/cm^3$ or greater, or about 0.60 $g/cm^3$ or greater, or about 0.65 $g/cm^3$ or greater, or about 0.70 $g/cm^3$ or greater, or about 0.75 $g/cm^3$ or greater, or about 0.80 $g/cm^3$ or greater, or about 0.85 $g/cm^3$ or greater. Additionally or alternatively, the molded body has a density of about 1.20 $g/cm^3$ or less, or about 1.15 $g/cm^3$ or less, or about 1.10

Figure 2B:
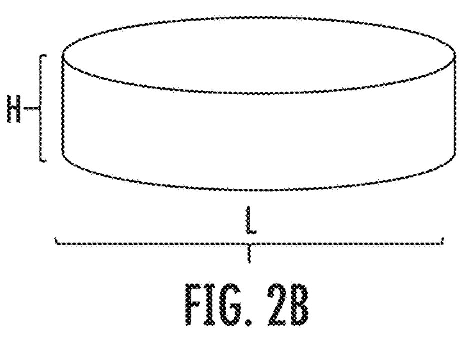
FIGS. 2B and 2C each show molded bodies according to the process of FIG. 1.
Figure 2C:
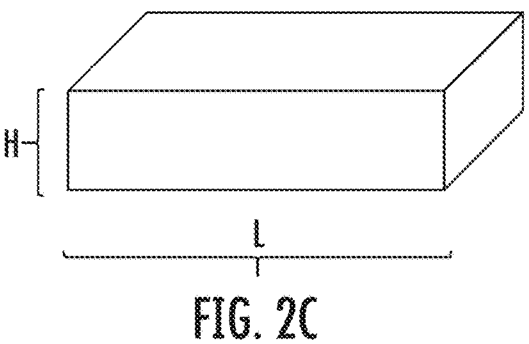

$g/cm^3$ or less, or about 1.00 $g/cm^3$ or less, or about 0.95 $g/cm^3$ or less, or about 0.90 $g/cm^3$ or less, or about 0.85 $g/cm^3$ or less, or about 0.80 $g/cm^3$ or less, or about 0.75 $g/cm^3$ or less, or about 0.70 $g/cm^3$ or less. In embodiments, the molded body has a density from about 0.50 $g/cm^3$ to about 1.20 $g/cm^3$, or about 0.60 $g/cm^3$ to about 1.10 $g/cm^3$, or about 0.80 $g/cm^3$ to about 1.00 $g/cm^3$, or about 0.90 $g/cm^3$ to about 0.95 $g/cm^3$. The molded body is formed such that any density variation in the body is about 5% or less, or about 4% or less, or about 3% or less, or about 2% or less, or about 1% or less, or about 0.75% or less, or about 0.50% or less, or about 0.25% or less, or about 0.20% or less, or about 0.15% or less, or about 0.10% or less, or about 0.05% or less, or about 0.02% or less, or about 0.010% or less, or about 0.00% from an average density across the body. FIG. 2B shows an exemplary cylindrical molded body and FIG. 2C shows an exemplary rectangular molded body, although the molded body may comprise other shapes than those specifically depicted herein. As shown in FIGS. 2B and 2C, the molded body has a length L and a height H. It is noted that the length L is also the diameter for the cylindrical body of FIG. 2B.

In embodiments, the length L of the body may be from about 0.02 m to about 1.30 m, or about 0.04 m to about 1.20 m, or about 0.06 m to about 1.00 m, or about 0.08 m to about 0.80 m, or about 0.10 m to about 0.60 m, or about 0.20 m to about 0.40 m. Furthermore, in some embodiments, the height H of the body is about 0.05 m to about 0.50 m, or about 0.06 m to about 0.40 m, or about 0.08 m to about 0.20 m, or about 0.10 m to about 0.20 m, or about 0.25 m to about 0.50 m, or about 0.25 m to about 0.40 m, or about 0.25 m to about 0.30 m, or about 0.20 m to about 0.50 m, or about 0.20 m to about 0.40 m, or about 0.20 m to about 0.30 m. However, it is noted that the length L and height H of the body can vary and are not limited by the embodiments disclosed herein. It is also noted that in some embodiments, the length L is larger than the height H of the body, while in other embodiments the height H is larger than the length L.

With reference again to process 100, at step 130, the molded body is then consolidated. After consolidation, the body is melted and then annealed at step 140 to relax any internal stress in the body. Relaxed internal stress allows for better quality cutting and machining of the body, such as slicing the body into a plurality of slices. In some embodiments, the body is annealed for a duration of about 100 hours or more, or about 200 hours or more, or about 250 hours or more. The maximum annealing temperature may be from about 750° C. to about 1200° C., or about 800° C. to about 1100° C., or about 900° C. to about 1000° C. Once the annealing step is complete, the body is ready for slicing.

In traditional consolidation processes (during step 130 of process 100), the molded body is placed into a consolidation furnace and heated. A traditional heating process includes heating the molded body to a temperature from about 900° C. to about 1100° C. and then slowly heating the body to a temperature from about 1100° C. to about 1300° C. at a heating rate of about 1° C./hour to about 36° C./hour. However, during these heating steps in such traditional consolidation processes, the body may experience temperature differences between inner and outer portions of the body. These temperature differences may cause differences in hydroxyl concentration throughout the body, thus producing bodies with uneven and non-uniform hydroxyl concentrations.

Figure 3:
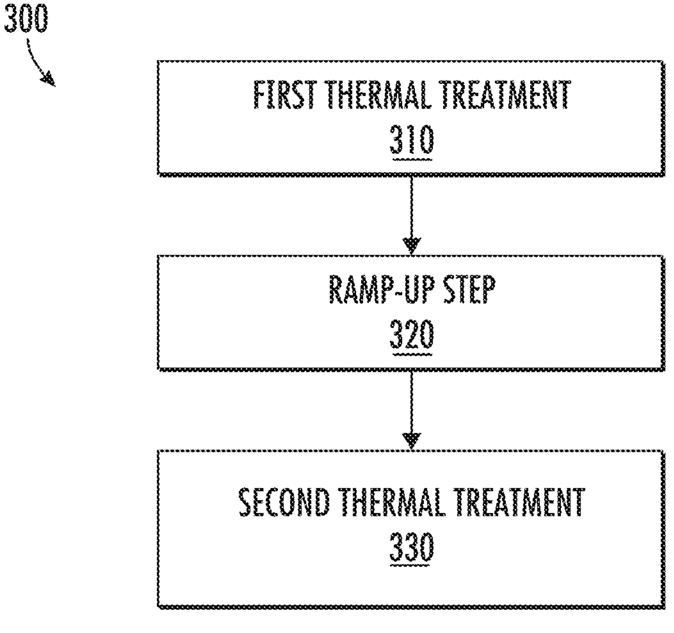
FIG. 3 is a flowchart of a consolidation process of the process of FIG. 1.

Embodiments of the present disclosure replace the heating steps of the traditional consolidation process with process 300 of FIG. 3. As shown in FIG. 3, consolidation of the molded body (step 130 of process 100), according to the embodiments of the present disclosure, comprises exposing the molded body to a first thermal treatment step and a second thermal treatment step with a ramp-up step therebetween. More specifically, step 310 of FIG. 3 comprises the first thermal treatment step during which the body is held at a first temperature T1 between about 800° C. and about 1100° C., or about 825° C. and about 1075° C., or about 850° C. and about 1050° C., or about 875° C. and about 1025° C., or about 900° C. and about 1000° C., or about 925° C. and about 975° C., or about 950° C. and about 1000° C. The body may be held at the first temperature T1 such that the first temperature T1 is constant during the entirety of the first thermal treatment, with any temperature varying only by about 5° C. or less, or about 4° C. or less, or about 3° C. or less, or about 2° C. or less, or about PC or less, or about 0.5° C. or less from an average temperature during the first thermal treatment. Due to such constant temperature, the first thermal treatment may also be referred to as an isothermal hold.

During the first thermal treatment, the body is heated for a first time duration t1 as shown in the following equation:

$$t1 > \frac{L_c^2}{4\alpha}$$

wherein $L_c$ is the characteristic length (cm) of the molded body, which as used herein is the smallest of the length L and height H of the body. Therefore, if the body is formed such that its height H is smaller than its length L, the height H of the body is its characteristic length $L_c$. Conversely, if the body is formed such that its length L is smaller than its height H, the length L of the body is its characteristic length $L_c$. Furthermore, a is the thermal diffusivity ($cm^2$/sec) of the molded body. The thermal diffusivity a is dependent on the density (ρ) of the silica soot of the molded body, the thermal conductivity ($k_g$) of the silica soot of the molded body, and the heat capacity ($c_p$) of the silica soot of the molded body and is given as $k_g/(\rho c_p)$. For purposes of the present disclosure, when calculating the thermal diffusivity a, it is assumed that the density of the silica soot is about 0.7 $g/cm^3$, which provides a thermal diffusivity a of 0.003 $cm^2$/sec. Therefore, unless stated otherwise, the thermal diffusivity a for the molded bodies disclosed herein is 0.003 $cm^2$/sec.

In embodiments, the first time duration t1 is from about 30 minutes to about 35 hours, or about 1 hour to about 30 hours, or about 1.5 hours to about 27 hours, or about 2 hours to about 25 hours, or about 4 hours to about 22 hours, or about 6 hours to about 20 hours, or about 8 hours to about 18 hours, or about 10 hours to about 15 hours, or about 12 hours to about 16 hours, or about 30 minutes to about 10 hours, or about 1 hour to about 8 hours, or about 15 hours to about 30 hours. In some exemplary embodiments, these time durations are for a body with a length L of 0.25 m and a height H of 0.25 m.

Heating of the body during the first thermal treatment step may be in an inert environment in the presence of an inert gas. By "inert gas," it is meant a gas that does not chemically react with the body. In some embodiments, as discussed further below, the body may be exposed to a steam doping process during the first thermal treatment step.

While not wishing to be bound by theory, it is believed that the first thermal treatment disclosed herein (step 310) advantageously produces uniform pressure and temperature in the body by enabling purging and removal of gases from the body, which ultimately helps to achieve the uniform hydroxyl concentrations disclosed herein. Furthermore, the first thermal treatment also, to a small degrees, sinters the glass body. But it is noted that the majority of glass sintering is during the second thermal treatment step.

With reference again to FIG. 3, step 320 of process 300 comprises a ramp-up step during which the temperature increases from the first temperature T1 to a second temperature T2. That is, the ramp-up step transitions from the first thermal treatment step to the second thermal treatment step. The increase in temperature from T1 to T2, during the ramp-up step, may be at a rate of about 20° C./hour or greater, or about 25° C./hour or greater, or about 30° C./hour or greater, or about 35° C./hour or greater, or about 40° C./hour or greater, or about 45° C./hour or greater, or about 50° C./hour or greater, or about 55° C./hour or greater, or about 60° C./hour or greater, or about 65° C./hour or greater, or about 70° C./hour or greater, or about 75° C./hour or greater, or about 80° C./hour or greater. In some embodiments, the increase in temperature from T1 to T2, during the ramp-up step, may be at a rate from about 20° C./hour to about 120° C./hour, or about 30° C./hour to about 100° C./hour, or about 40° C./hour to about 80° C./hour, or about 50° C./hour to about 100° C./hour, or about 50° C./hour to about 80° C./hour. A total time duration of the ramp-up step may be from about 0.5 hours to 18 hours, or about 1 hour to about 16 hours, or about 1.5 hours to about 14 hours, or about 2 hours to about 12 hours, or about 2.5 hours to about 12 hours, or about 3 hours to about 10 hours, or about 4.5 hours to about 8 hours, or about 5 hours to about 6 hours.

Step 330 of process 300 comprises the second thermal treatment during which the body is held at the second temperature T2, which is between about 1050° C. and about 1250° C., or about 1100° C. and about 1200° C., or about 1125° C. and about 1200° C., or about 1150° C. and about 1200° C., or about 1100° C. and about 1150° C., or about 1125° C. and about 1175° C., or about 1125° C. and 1150° C. The body may be held at the second temperature T2 such that the second temperature T2 is constant during the entirety of the second thermal treatment, with any temperature varying only by about 5° C. or less, or about 4° C. or less, or about 3° C. or less, or about 2° C. or less, or about 1° C. or less, or about 0.5° C. or less from an average temperature during the second thermal treatment. Due to such constant temperature, the second thermal treatment may also be referred to as an isothermal hold.

The body may be held at the second temperature T2 for a second time duration t2 of about 6 hours or greater, or about 10 hours or greater, or about 1 day or greater, or about 2 days or greater, or about 3 days or greater, or about 4 days or greater, or about 5 days or greater, or about 6 days or greater, or about 7 days or greater, or about 8 days or greater, or about 9 days or greater, or about 10 days or greater. In some embodiments, the maximum time duration may be about 20 days or less, or about 18 days or less, or about 16 days or less, or about 14 days or less, or about 12 days or less, or about 10 days or less, or about 8 days or less, or about 6 days or less, or about 4 days or less, or about 2 days or less, or about 1 day or less.

In embodiments, the second time duration t2 is longer than a characteristic sintering time, the characteristic sintering time being the time required to fully sinter the body during the consolidation of step 130 of process 100. The characteristic sintering time is determined by the following equation:

$$TCS = \frac{ms\mu}{\sigma}$$

wherein TCS is the characteristic sintering time (sec), m is a constant that is dependent on the temperature of the body and ranges from about 2.5 to about 50, s is the average soot particle size within the body (cm), μ is the viscosity of the body (grams/cm/sec), and 6 is the surface tension of the body (grams/sec$^2$). For purposes of the present disclosure, a constant m value of 50 was used to determine the characteristic sintering time. Because the second time duration t2 is longer that the characteristic sintering time, such allows radially inner and outer portions of the body to be at the same temperature (or approximately the same temperature) before the body is sintered. This helps to achieve the uniform and even hydroxyl concentrations disclosed herein. It is also noted that the characteristic sintering time is greater than the first time duration t1.

After completion of the second thermal treatment, the body is a fully dense titania-doped silica optical glass element and is substantially free of any inclusions or voids. Therefore, the time duration t2 must be long enough to completely consolidate the titania-doped silica soot compact into the fully dense titania-doped silica glass optical element.

Heating of the body during the second thermal treatment step may be in an inert environment in the presence of an inert gas. In some embodiments, as discussed further below, the body may be exposed to a steam doping process during the second thermal treatment step.

While not wishing to be bound by theory, it is believed that the majority of the glass sintering to fully consolidate the body is performed during the second thermal treatment disclosed herein (step 330). Because the second thermal treatment is performed at a constant temperature, the temperature of the body is uniform throughout the body during the sintering of the glass. Therefore, for example, inner and outer portions of the body are at the same temperature during the sintering of the glass. This advantageously produces the uniform hydroxyl concentrations disclosed herein.

After completion of the first thermal treatment step, the body has a uniform and even hydroxyl concentration across the body. However, the change in temperature during the ramp-up step may cause the hydroxyl concentration to not be as uniform and even. Such a uniform and even hydroxyl concentration in the body returns after the second thermal treatment step. But it is noted that without the initial uniformity from the first thermal treatment step, the body would not have such a uniform and even hydroxyl concentration after the second thermal treatment step. Stated another way, inclusion of the first thermal treatment helps to achieve the final uniform and even hydroxyl concentration after the second thermal treatment step.

The first thermal treatment step, the second thermal treatment step, and/or the ramp-up step may be conducted under vacuum pressure wherein the body is not actively doped with hydroxyl. These embodiments may be referred to as "no OH doping" because the thermal treatment steps and/or ramp-up step are conducted in an atmosphere that is free (or essentially free) of water and steam. In contrast, in other embodiments, the first thermal treatment step, the second thermal treatment step, and/or the ramp-up step may be conducted in the presence of steam, which is also referred to herein as steam doping. As discussed further below, the body is doped with hydroxyl during the steam doping such that the resultant glass body has a relatively higher concentration of hydroxyl. Conversely, the "no OH doping" process produces a glass body with a relatively lower concentration of hydroxyl.

In yet other embodiments, the molded precursor body may be actively dried during the first thermal treatment step, the second thermal treatment step, and/or the ramp-up step. During such active drying embodiments, the body is exposed to a drying agent while heating the body. In embodiments, the drying agent may be a halide, such as chloring and/or fluorine, or carbon monoxide. Actively drying the body during the thermal treatment steps and/or the ramp-up step produces a glass body with a reduced concentration of hydroxyl, even less when compared with the "no OH doping" process.

It is further noted that in the "no OH doping" and steam doping processes, the precursor body may not be exposed to a halide agent. Therefore, in these embodiments, the final glass body may not comprise a halide such that the glass body is halide-free (i.e., may comprise less than 100 ppm of a halide).

As discussed above, the body may be exposed to a steam doping process during the first thermal treatment step, the second thermal treatment step, and/or the ramp-up step so that the body is consolidated in the presence of steam. Such increases the hydroxyl concentration in the resultant glass body. The steam doping process comprises exposing the body to a steam-containing atmosphere within the consolidation furnace to load the body with hydroxyl groups. The steam-containing atmosphere may include only steam or steam in combination with an inert gas. The partial pressure of the steam may be about 1.0 atm or less, or about 0.50 atm or less, or about 0.40 atm or less, or about 0.30 atm or less, or about 0.20 atm or less, or about 0.10 atm or less, or about 0.05 atm or less. In embodiments, the partial pressure of the steam is greater than about 0.00 atm, or about 0.01 atm or greater, or about 0.05 atm or greater, or about 0.08 atm or greater, or about 1.0 atm or higher, or greater than about 0.00 atm to about 1.0 atm, or about 0.05 atm to about 1.0 atm, or about 0.25 atm to about 0.8 atm, or about 0.50 atm to about 0.75 atm, or greater than about 0.00 atm to about 0.25 atm, or greater than about 0.00 atm to about 0.20 atm. It is noted that in embodiments in which the body is exposed to the "no OH doping" process (as opposed to the steam doping process), the partial pressure of steam within the consolidation furnace is at 0.0 atm (it is noted that 0.0 atm may only be achieved in theory while, in practice, a partial pressure of about 0.02 atm or less may be achieved for the "no OH doping" process due to practical limitations). During the steam doping process, the steam partial pressure should be constant within the consolidation furnace with any pressure difference being only +/−2% of the absolute pressure in the furnace. It is also noted that longer steam doping exposure times lead to higher concentrations of hydroxyl in the body.

In some embodiments, the body is exposed to an environment comprised of steam during the first thermal treatment step, the ramp-up step, and the second thermal treatment step. In other embodiments, the body is exposed to an environment comprised of steam during the second thermal treatment step (but not during first thermal treatment step and not during the ramp-up step). In still other embodiments, the body is exposed to an environment devoid of steam in the first thermal treatment step and in the ramp-up step and for a hold-time $t_{hold}$ in the second thermal treatment step, followed by exposure of the body to an environment comprised of steam for the remaining duration ($t_{rem}$) of the second thermal treatment step. In some embodiments, the hold-time $t_{hold}$ is equal to or greater than the first time duration t1 of the first thermal treatment step. For example, the hold-time $t_{hold}$ is from about 30 minutes to about 35 hours, or about 1 hour to about 30 hours, or about 1.5 hours to about 27 hours, or about 2 hours to about 25 hours, or about 4 hours to about 22 hours, or about 6 hours to about 20 hours, or about 8 hours to about 18 hours, or about 10 hours to about 15 hours, or about 12 hours to about 16 hours, or about 30 minutes to about 10 hours, or about 1 hour to about 8 hours, or about 15 hours to about 30 hours. The steam duration of $t_{rem}$ is equal to the total consolidation time (second time duration t2) minus the time duration of $t_{hold}$. In some exemplary embodiments, the steam duration of $t_{rem}$ is from about 25 hours to about 10 days, or about 30 hours to about 8 days, or about 32 hours to about 6 days, or about 35 hours to about 4 days, or about 30 hours to about 2 days.

The use of steam in the above-disclosed steam doping processes offers many benefits including the benefit of high hydroxyl concentration in the glass, which reduces viscosity, promotes low fictive temperature, and avoids seed formation in the glass.

Additional embodiments of the above-disclosed steam doping process are disclosed in U.S. Pat. No. 9,580,350, which is incorporated by reference in its entirety.

In embodiments, the steam doping process begins during the second thermal treatment step. Therefore, during the second thermal treatment step, the body is exposed to the steam-containing atmosphere. In yet some embodiments, the steam doping process begins during the second thermal treatment step but only after equilibrium has been reached.

In some embodiments, the consolidation process comprises the above-disclosed steam doping process (during at least one of the first thermal treatment step, the second thermal treatment step, and the ramp-up step) and, during the second thermal treatment step, the body is held at temperature T2 from about 1100° C. to about 1150° C., or about 1125° C. In other embodiments, the consolidation process comprises the above-disclosed "no OH doping" and, during the second thermal treatment step, the body is held at temperature T2 from about 1125° C. to about 1175° C., or about 1150° C.

With the completion of the consolidation process, which comprises the steps of process 300, the molded body is now converted to consolidated glass. As discussed above with reference to process 100 of FIG. 1, the consolidated glass is then annealed.

Figure 4A:
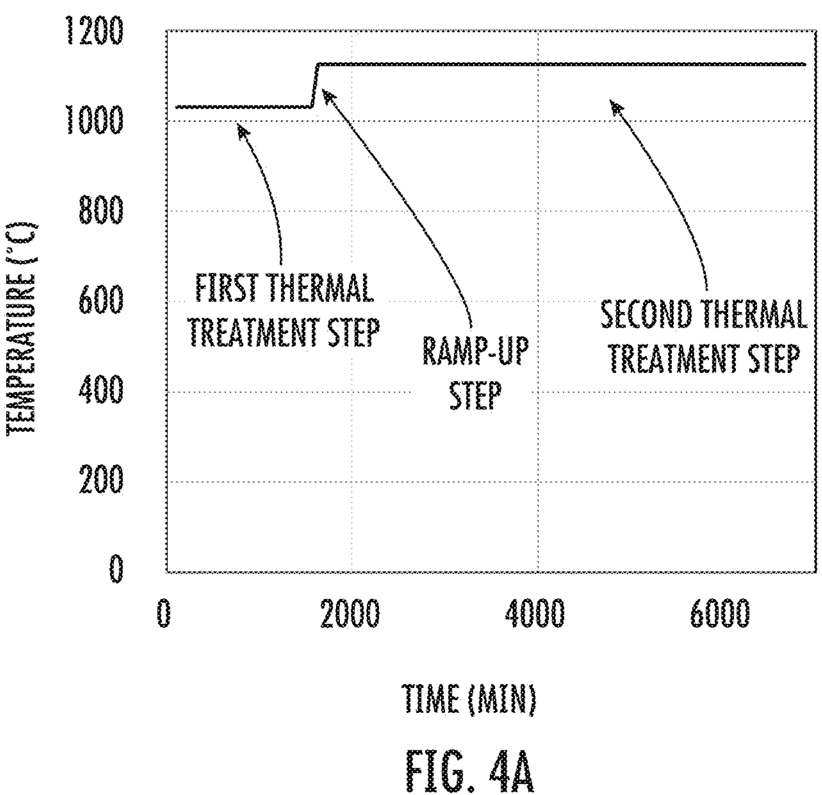
FIG. 4A is a plot of temperature vs. time for an exemplary consolidation process according to the process of FIG. 3.

FIG. 4A shows a plot of temperature vs. time of an exemplary consolidation process comprising the first and second thermal treatment steps, according to the embodiments disclosed herein. In this example, the first thermal treatment step is at a temperature T1 of 1030° C. and the second thermal treatment step is at a temperature T2 of 1125° C. Furthermore, the ramp-up step between the first and second thermal treatment steps is at a heating rate of 50° C./hour in this exemplary example. It is also noted that this exemplary consolidation process includes the steam doping process described above.

Figure 4B:
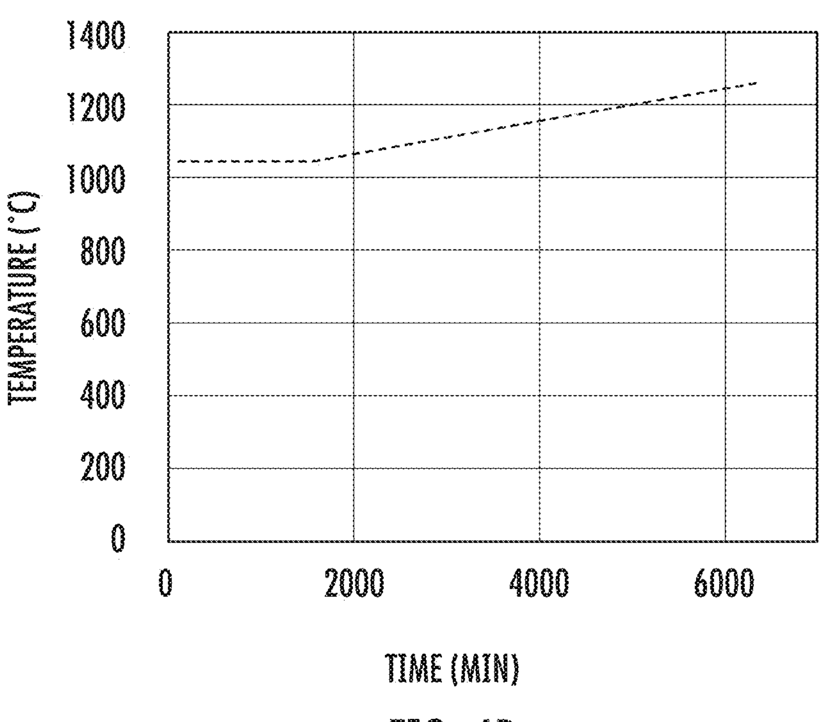
FIG. 4B is a plot of temperature vs. time for a traditional consolidation process.

By comparison, FIG. 4B shows a plot of temperature vs. time of a traditional consolidation process. As discussed above, this traditional process comprises slowly heating the body at a heating rate of about 1° C./hour to about 36° C./hour. The traditional process does not encompass the isothermal hold of both the first and second thermal treatment steps nor the ramp-up step.

Figure 4C:
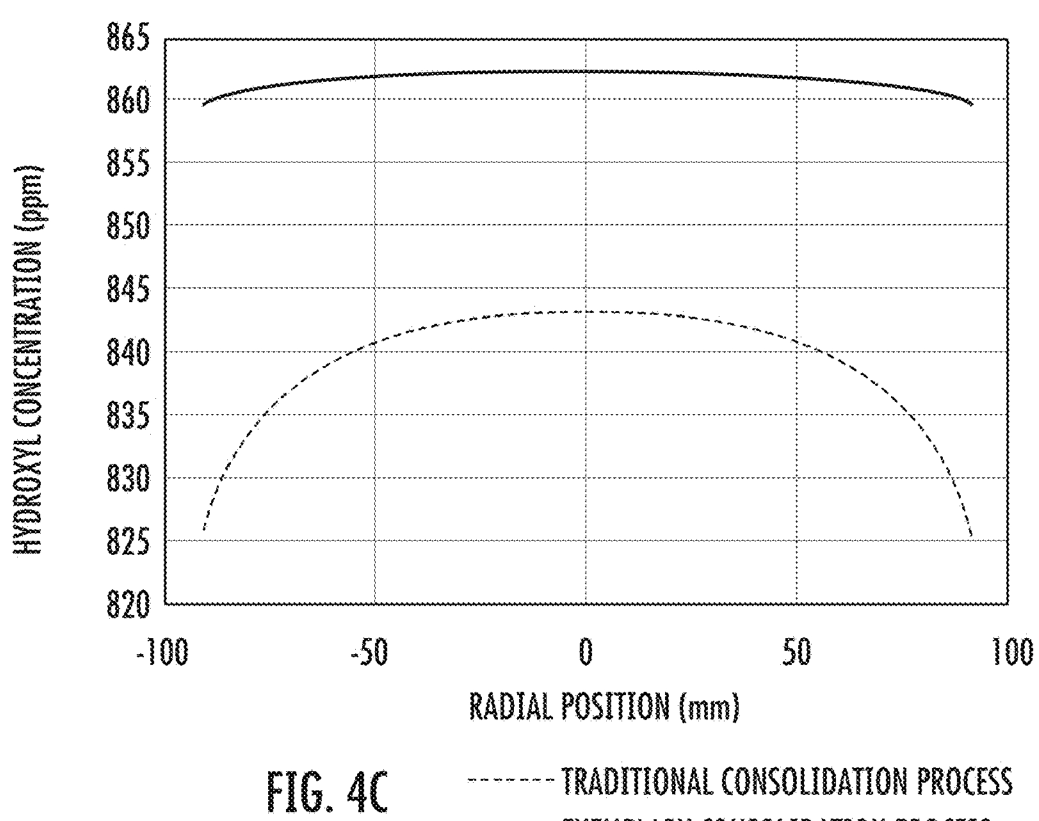
FIG. 4C is a plot of hydroxyl concentration vs. radial position for both the exemplary consolidation process of FIG. 4A and the traditional consolidation process of FIG. 4B.

FIG. 4C shows modeled hydroxyl concentrations of a glass sample produced with the exemplary consolidation process of FIG. 4A compared with the traditional consolidation process of FIG. 4B. The hydroxyl concentrations of the glass samples were measured over a 0.127 m×0.127 m area of each sample. As shown in FIG. 4C, the glass sample produced by the exemplary consolidation process had a more uniform concentration of hydroxyl along the measured radial length of the sample. In comparison, the glass sample produced with the traditional consolidation process had much lower concentrations of hydroxyl at the radial outer ends of the measured portion of the sample than at the center. The process to measure hydroxyl concentration is discussed further below.

Figure 4D:
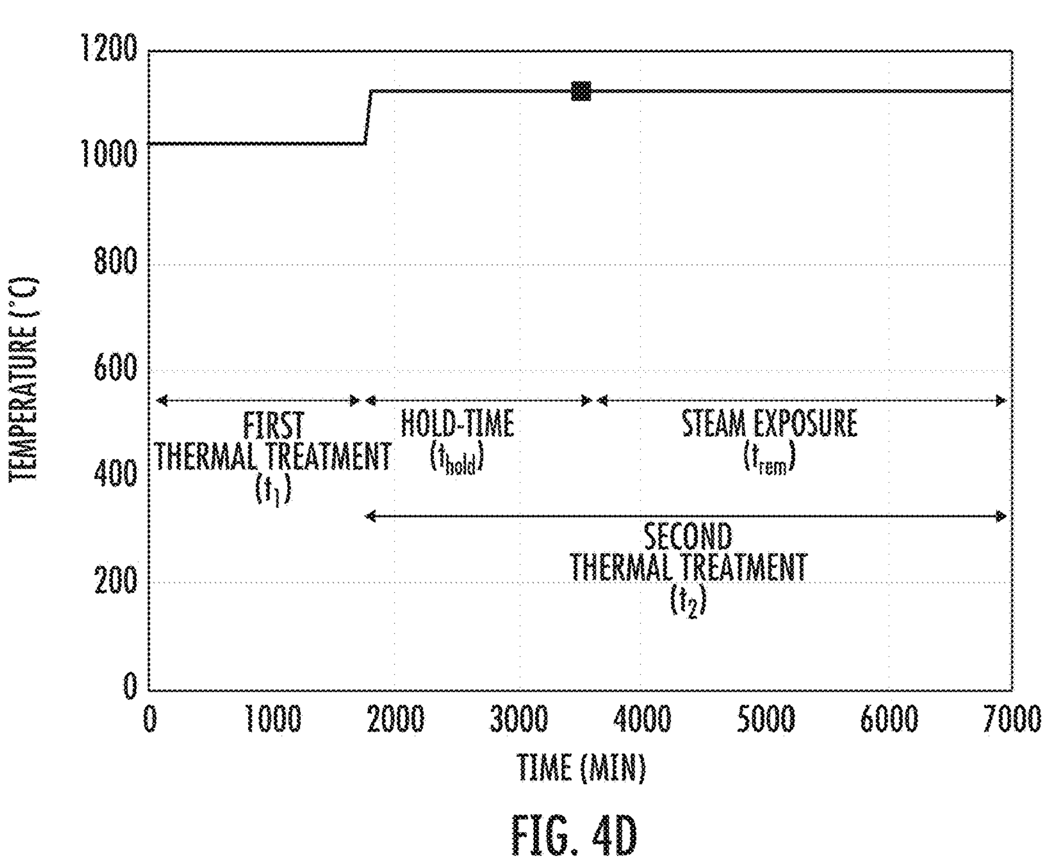
FIG. 4D is a plot of temperature vs. time for another exemplary consolidation process according to the process of FIG. 3.

FIG. 4D shows another plot of an exemplary consolidation process comprising the first and second thermal treatment steps, according to the embodiments disclosed herein. In this example, the first thermal treatment step is at a temperature T1 of 1030° C., the second thermal treatment step is at a temperature T2 of 1125° C., and the ramp-up step is at a heating rate of 50° C./hour (similar to the embodiment of FIG. 4A). However, in this embodiment, the body is not exposed to a steam environment during the hold-time $t_{hold}$ of the second thermal treatment step. After completion of the hold-time $t_{hold}$, the body is exposed to a steam environment for the duration $t_{rem}$, which is also the remainder of the second thermal treatment step. In the exemplary embodiment of FIG. 4D, the hold-time $t_{hold}$ is for a duration of about 25 hours and $t_{rem}$ is for a duration of about 2.5 days.

Figure 5A:
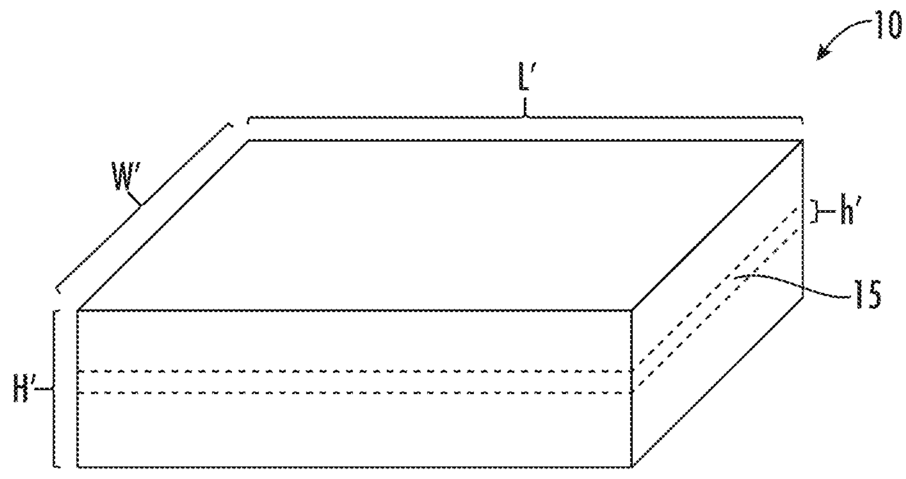
FIG. 5A shows an exemplary glass body, according to embodiments disclosed herein.

For purposes of the present disclosure, the hydroxyl concentrations were measured by segmenting the body into a plurality of segments and measuring the hydroxyl concentration of each segment, as discussed below with reference to FIGS. 5A through 5C. FIG. 5A shows a body 10 produced by the process 100 of FIG. 1 with the exemplary consolidation process 300 of FIG. 3. Thus, body 10 is the resultant body after the annealing step 140 of process 100. Body 10 may be an ingot or a substrate to which one or more layers are applied in downstream processing.

As discussed above, body 10 is titania-doped silica glass. The silica concentration in body 10 may be about 80 wt. % or more, or about 85 wt. % or more, or about 90 wt. % or more, or about 92 wt. % or more, or about 95 wt. % or more, or about 97 wt. % or more, or about 98 wt. % or more, or about 99 wt. % or more, or from about 85 wt. % to about 97 wt. %, or from about 90 wt. % to about 95 wt. %. The titania concentration in body 10 may be from about 1.0 wt. % to about 15.0 wt. %, or from about 6.0 wt. % to about 12.0 wt. %, or from about 6.0 wt. % to about 8.5 wt. %, or from about 6.5 wt. % to about 8.0 wt. %, or from about 7.0 wt. % to about 7.7 wt. %, or from about 6.5 wt. % to about 7.8 wt. %.

Body 10 has a length L', a width W', and a height H', as shown in FIG. 5A. In some embodiments, each of the length L' and the width W is greater than the height H'. For example, the length L' and the width W' may each be about 500 mm or less, or about 450 mm or less, or about 400 mm or less, or about 350 mm or less, or about 300 mm or less, or about 250 mm or less, or about 200 mm or less, or about 150 mm or less, or about 100 mm or less, or about 75 mm or less, or about 50 mm or less, or about 25 mm or less, or about 20 mm or less, or about 15 mm or less. Additionally or alternatively the length L' and width W' of glass body 10 are each about 15 mm or greater, or about 20 mm or greater, or about 25 mm or greater, or about 50 mm or greater, or about 75 mm or greater, or about 100 mm or greater, or about 150 mm or greater, or about 200 mm or greater, or about 250 mm or greater, or about 300 mm or greater, or about 350 mm or greater, or about 400 mm or greater, or about 450 mm or greater, or about 500 mm or greater. In some embodiments, both the length L' and the width W' are about 150 mm, or about 152 mm, or about 179 mm. However, it is also contemplated that the length L' can be different from the width in some embodiments.

Furthermore, the height H' may be smaller than each of the length L' and the width W'. In some embodiments, the height H' is about 400 mm or less, or about 350 mm or less, or about 300 mm or less, or about 250 mm or less, or about 200 mm or less, or about 150 mm or less, or about 100 mm or less, or about 75 mm or less, or about 50 mm or less, or about 25 mm or less, or about 20 mm or less, or about 15 mm or less, or about 10 mm or less, or about 5 mm or less. Additionally or alternatively, the height H' is about 5 mm or greater, or about 10 mm or greater, or about 15 mm or greater, or about 20 mm or greater, or about 25 mm or greater, or about 50 mm or greater, or about 75 mm or greater, or about 100 mm or greater, or about 150 mm or greater, or about 200 mm or greater, or about 250 mm or greater, or about 300 mm or greater, or about 350 mm or greater, or about 400 mm or greater. In some embodiments, the height H' is about 63 mm, or about 150 mm, or about 152 mm.

As also discussed above, body 10 may be sliced into a plurality of samples. FIG. 5A shows an exemplary sample 15 of body 10 that forms a sub-portion of the body along the smallest dimension (i.e., the characteristic length $L_c$) of body 10. Each sample 15 may also be considered to be a body or a substrate or a wafer. In the embodiment, of FIG. 5A, the height H' is less than each of the length L' and the width W' so that the height H' is the smallest dimension. Thus, the height h' of sample 15 extends along the height H' of body 10. In the embodiment of FIG. 5A, body 10 comprises multiple samples along its height H'. However, it is also contemplated in other embodiments, that one sample 15 extends along the entire height H' of body 10 (or along the entire smallest dimension of body if the smallest dimension is not the height H'). In these embodiments, body 10 only comprises one sample 15 such that the one sample 15 forms the entire body 10.

Although FIG. 1 depicts body 10 and sample 15 as being square components with flat surfaces, it is also contemplated in embodiments that body 10 and/or sample 15 comprise other shapes. For example, the outer profile of body 10 and/or sample 15 can be circular or elliptical or a non-symmetrical shape. Furthermore, body 10 and/or sample 15 can be curved forming a concave or convex structure. In one exemplary embodiment, body 10 is formed of a single sample 15 (such that the single sample 15 extends for the entire length, width, and height of body 10) and body 10 has a concave structure. Sample 15 may be a reticle, photomask, mirror, and/or a photomask holder.

Each sample 15 has substantially uniform hydroxyl and titania concentrations across the length and width of the sample. In order to determine the uniformity of the samples in a body, each sample is divided into segments across the length and width of the sample. For example, FIG. 5B shows sample 15 divided into segments 20 across the cross-sectional length L' and width W' of sample 15. The concentration of one or more components (e.g., hydroxyl, titania) may be then determined for each segment 20 in order to determine the uniformity of each of these components along sample 15. For example, the concentration of hydroxyl may be measured for each segment 20 in order to determine the hydroxyl concentration uniformity across the cross-section of sample 15. As discussed further below, the concentration of the one or more components is determined through the full thickness h' of each segment 20.

Figure 5B:
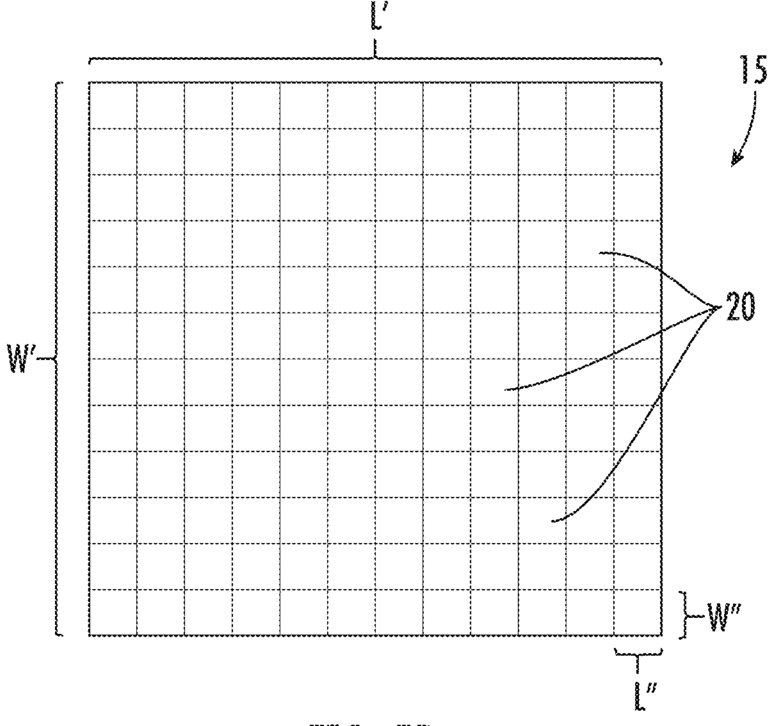
FIG. 5B shows a cross-section of a sample of the glass body of FIG. 5A, according to embodiments disclosed herein.
Figure 5C:
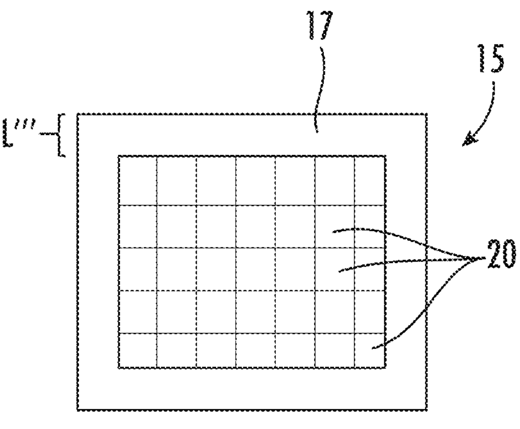
FIG. 5C shows another cross-section of a sample of the glass body of FIG. 5A with an outer, peripheral lip, according to embodiments disclosed herein.

Although FIG. 5B shows segments 20 as extending along the entire length L' and width W' of sample 15, it is also contemplated that the portion of sample 15 that comprises segments 20 may be less than the entire cross-sectional length L' and width W'. For example, as shown in FIG. 5C, sample 15 may comprise an outer, peripheral lip 17 upon which segments 20 are not formed. Therefore, outer, peripheral lip 17 may be a clearance between the end of segments 20 and the outer edge of sample 15. In embodiments, the outer, peripheral lip may extend for a length L''' from about 2 mm to about 20 mm, or about 4 mm to about 16 mm, or about 5 mm to about 16 mm, or about 8 mm to about 14 mm, or about 10 mm to about 12 mm. In some embodiments, the length L''' is about 12.5 mm or about 12.7 mm.

Segments 20 may be adjacent segments across a specific length and width of sample 15 (such that no gaps are formed between the adjacent segments). As discussed above, this specific length and width (across which all the segments 20 extend) may be equal to or less than the length L' and width W' of sample 15. In embodiments, segments 20 are adjacent segments across a length and width (across which all the segments 20 extend) of sample 15 such that the length and width are each about 25 mm or greater, or about 30 mm or greater, or about 40 mm or greater or about 50 mm or greater, or about 60 mm or greater, or about 75 mm or greater, or about 100 mm or greater, or about 125 mm or greater, or about 150 mm or greater, or about 175 mm or greater, or about 180 mm or greater, or about 190 mm or greater, or about 200 mm or greater, or about 250 mm or greater.

When sample 15 comprises a flat surface, segments 20 are formed along the flat planar surface, as shown in FIG. 5B. However, when sample 15 comprises a concave or convex surface, segments 20 are formed along the curving surface of sample 15.

As shown in FIG. 5B, each segment 20 has a length L" and a width W" that are each about 12.7 mm. However, it is also contemplated in other embodiments that the length L" is not equal to the width W". It is also noted that in some embodiments, the length L" and the width W" of segments 20 may be equal to the length L''' of peripheral lip 17.

The height of each segment 20 is the height h' of sample 15, as discussed above. Therefore, in embodiments, the height h' is about 7.62 mm.

As discussed above, the concentration of one or more components may be determined within each segment 20. Therefore, for example, the concentration of hydroxyl may be determined for each adjacent segment 20 within sample 15. When each segment 20 has a length and width of 12.7 mm, the concentration of the components is determined at a frequency of 12.7 mm across the cross-section of sample 15. For example, the concentration of hydroxyl is measured at a frequency of 12.7 mm across the cross-section of sample 15.

The concentration of hydroxyl for each segment 20 is measured using Fourier transform infrared spectroscopy ("FTIR") in transmission. As used herein, "in transmission" means that the light is directed through the glass body to be measured to determine the hydroxyl concentration (rather than using light that is reflected from the body to be measured to determine the hydroxyl concentration). Therefore, "in transmission" requires a non-scattering surface. Once sample 15 is loaded into the FTIR for measurement, a beam alignment and background measurement may be performed first. Then the FTIR measures the fundamental absorption peak for hydroxyl, which measures the peak height with respect to the background signal, the background signal being a straight line between the points surrounding the absorption peak. The absorption peak height is then divided by the thickness h' of sample 15 to yield an absorption coefficient $\beta_{OH}$. The hydroxyl concentration is then derived from the absorption coefficient $\beta_{OH}$ using the equation:

$$C=\beta_{OH}/\varepsilon\times \mathrm{MW}_{OH}/D_{glass}\times 106$$

where C is the concentration of hydroxyl in ppm for a particular segment 20, $\beta_{OH}$ is the absorption coefficient of the glass, E is the molar absorptivity of hydroxyl for the absorption peak at a wavenumber of 3670 $cm^{-1}$, $MW_{OH}$ is the molecular weight of hydroxyl (g/mol), and $D_{glass}$ is the density of hydroxyl ($g/cm^3$). The above-disclosed FTIR analysis is further disclosed in K. M. Davis, et al, "Quantitative infrared spectroscopic measurement of hydroxyl concentration in silica glass," J. Non-Crystalline Solids, 203 (1996) 27-36, which is incorporated by reference herein. As discussed above, the hydroxyl concentration is measured for each segment 20 of sample 15 and is measured through the full thickness h' of each segment 20. The hydroxyl concentration measurement is then repeated over all segments 20 of sample 15.

One or more segments 20 may have a different concentration of hydroxyl from one or more other segments 20. However, in embodiments, segments 20 each have substantially the same concentration of hydroxyl regardless of where the segment is located on substate 10.

Furthermore, an average hydroxyl concentration along the length L' and width' of sample 15 may be determined by averaging together the hydroxyl concentrations of the individual segments 20. According to the embodiments disclosed herein, the average hydroxyl concentration of the entirety of sample 15 may be in a range from about 0 ppm to about 2000 ppm, or about 200 ppm to about 1900 ppm, or about 300 ppm to about 1800 ppm, or about 400 ppm to about 1700 ppm, or about 500 ppm to about 1750 ppm, or about 600 ppm to about 1600 ppm, or about 700 ppm to about 1500 ppm, or about 800 ppm to about 1400 ppm, or about 900 ppm to about 1300 ppm, or about 1000 ppm to about 1200 ppm, or about 1000 ppm to about 1100 ppm, or about 600 ppm to about 1500 ppm, or about 600 ppm to about 1400 ppm, or about 600 ppm to about 1300 ppm, or about 700 ppm to about 1000 ppm, or about 50 ppm to about 200 ppm, or about 75 ppm to about 150 ppm, or about 80 ppm to about 125 ppm. In some embodiments, the average hydroxyl concentration of the entirety of sample 15 is about 400 ppm or less, or about 350 ppm or less, or about 300 ppm or less, or about 250 ppm or less, or about 200 ppm or less, or about 150 ppm or less, or about 100 ppm or less, or about 90 ppm or less, or about 80 ppm or less, or about 75 ppm or less, or about 70 ppm or less, or about 60 ppm or less, or about 50 ppm or less.

In some particular embodiments, the maximum hydroxyl concentration among segments 20 may be in a range from about 1000 ppm to about 1400 ppm, or from about 1000 ppm to about 1300 ppm, or from about 1000 ppm to about 1200 ppm, or from about 1000 ppm to about 1100 ppm, or from about 1050 ppm to about 1100 ppm, or from about 1060 ppm to about 1090 ppm. The minimum hydroxyl concentration among segments 20, in some particular embodiments, may be in a range from about 600 ppm to about 1300 ppm, or from about 800 ppm to about 1200 ppm, or from about 900 ppm to about 1100 ppm, or from about 1000 ppm to about 1100 ppm, or from about 1050 ppm to about 1100 ppm, or from about 1060 ppm to about 1080 ppm, or from about 100 ppm to about 500 ppm, or from about 200 ppm to about 400 ppm.

It is noted that the hydroxyl concentration within segments 20 is dependent on whether the above-disclosed consolidation process includes a steam doping process or not. As discussed above, such a steam doping process produces a substate with a higher concentration of hydroxyl.

The difference between the highest average concentration and the lowest average concentration of hydroxyl among the different segments 20 is also determined. More specifically, the segment 20 with the highest hydroxyl concentration is compared with the segment 20 with the lowest hydroxyl concentration. Then, the difference between the highest and lowest hydroxyl concentrations is calculated. This difference between the highest concentration and the lowest concentration in a sample 15 is referred to as the peak-to-valley (P-V) difference in concentration. The lower the P-V difference, the more uniform the concentration is in a particular sample.

The P-V difference of hydroxyl concentration of segments 20 in sample 15 may be about 70 ppm or less, or about 60 ppm or less, or about 55 ppm or less, or about 50 ppm or less, or about 45 ppm or less, or about 40 ppm or less, or about 35 ppm or less, or about 30 ppm or less, or about 25 ppm or less, or about 20 ppm or less, or about 15 ppm or less, or about 10 ppm or less, or about 5.0 ppm or less, or about 2.5 ppm or less, or about 1.0 ppm or less, or about 0.0 ppm. Additionally or alternatively, the P-V difference of hydroxyl concentration of segments 20 may be about 0.0 ppm or greater, or about 1.0 ppm or greater, or about 2.5 ppm or greater, or about 5.0 ppm or greater, or about 10 ppm or greater, or about 15 ppm or greater, or about 20 ppm or greater, or about 25 ppm or greater, or about 30 ppm or greater, or about 35 ppm or greater, or about 40 ppm or greater, or about 45 ppm or greater, or about 50 ppm or greater. In some embodiments, the P-V difference of average hydroxyl concentration of segments 20 is within a range of about 0.0 ppm to about 60 ppm, or about 10 ppm to about 50 ppm, or about 15 ppm to about 45 ppm, or about 20 ppm to about 40 ppm, or about 10 ppm to about 30 ppm.

As discussed above, the P-V difference of hydroxyl concentration amongst segments 20 is very low, thus providing a homogenous and uniform glass body 10. Due to such low P-V differences, glass body 10 will maintain its figure in an EUV system. It is noted that the embodiments of the present disclose comprise the above-disclosed P-V ranges at varying maximum and average hydroxyl concentrations. Therefore, for example, the above-disclosed P-V ranges may be in embodiments with relatively high hydroxyl concentrations and in embodiments with relatively low hydroxyl concentrations.

The P-V difference of titania concentration of segments 20 in sample 15 may be about 0.0100 wt. % or less, or about 0.0090 wt. % or less, or about 0.0080 wt. % or less, or about 0.0070 wt. % or less, or about 0.0060 wt. % or less, or about 0050 wt. % or less, or about 0.0040 wt. % or less, or about 0.0035 wt. % or less, or about 0.0030 wt. % or less, or about 0.0025 wt. % or less, or about 0.0020 wt. % or less, or about 0.0015 wt. % or less, or about 0.0010 wt. % or less. In embodiments, the P-V difference of titania concentration of segments 20 is in range from about 0.0010 wt. % to about 0.0050 wt. %, or about 0.0015 wt. % to about 0.0045 wt. %, or about 0.0020 wt. % to about 0.0040 wt. %, or about 0.0025 wt. % to about 0.0035 wt. %, or about 0.0030 wt. % to about 0.0050 wt. %, or about 0.0010 wt. % to about 0.0030 wt. %, or about 0.0010 wt. % to about 0.0025 wt. %, or about 0.0010 wt. % to about 0.0020 wt. %.

The P-V difference of titania concentration in glass body 10 is very low, thus providing a homogenous glass body 10 with not only a uniform concentration of hydroxyl but also of titania.

The concentration of titania of each segment 20 is calculated based upon the measured refractive index of each segment 20. As in well-known in the art, the concentration of titania in a glass body correlates to the refractive index of the glass body. Therefore, for purposes of the present disclosure, refractive index is measured in order to determine the titania concentration of the glass bodies disclosed herein. More specifically, an optical interferometer operating at a wavelength of 633 nm is used to measure the refractive index. In particular, the optical interferometer is a Zygo Verifire HD from Zygo Corporation with a 270 micron pixel size resolution and operating at a wavelength of 633 nm. The optical interferometer is set so that the pixels are square with a size of 270 microns×270 microns, and each pixel extends through the full thickness h' of sample 15. The refractive index is measured at each pixel within a segment 20 and through the full thickness of the pixel. The refractive indexes, which were each measured for each pixel within a segment 20, are then averaged together to determine the average refractive index of each segment 20. The refractive index measurement is then repeated over all segments 20 of sample 15.

Figure 6:
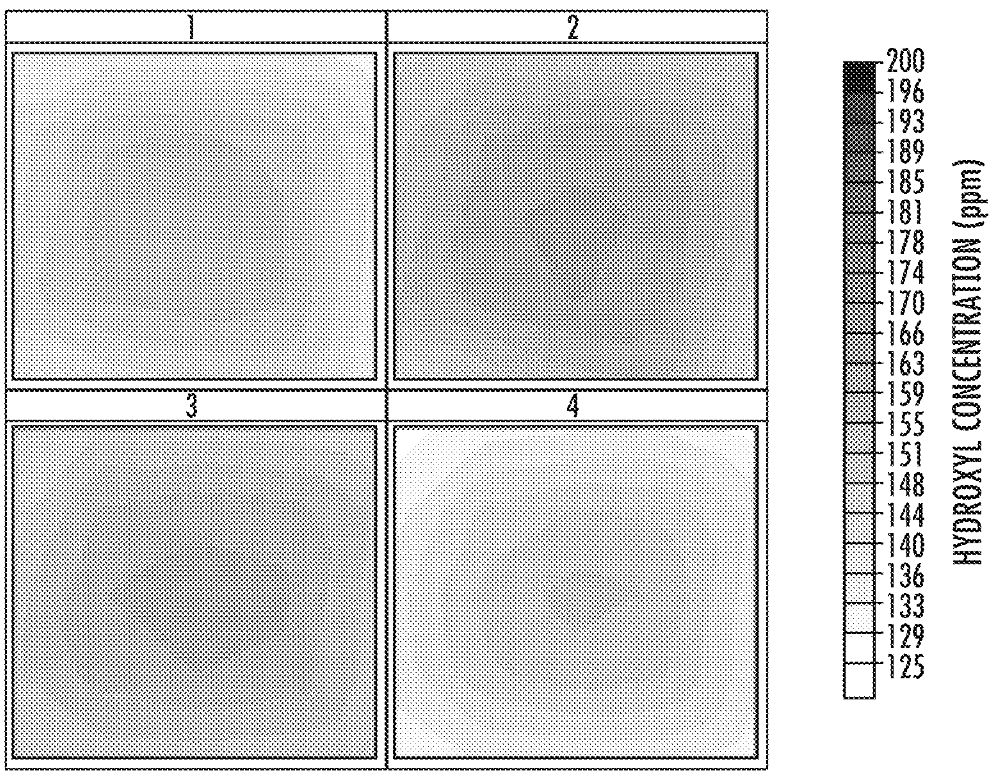
FIG. 6 is a plot of hydroxyl concentration along samples of glass bodies, according to embodiments disclosed herein.

FIG. 6 shows exemplary plots of the distribution of hydroxyl concentration in four samples sliced from the same body. As shown in FIG. 6, the four samples each have a uniform hydroxyl concentration along the length and width of the sample, with very little difference in concentration. Furthermore, the four samples all have uniform hydroxyl concentrations amongst the different samples. Thus the body as a whole, from which the samples were sliced, also has a uniform hydroxyl concentration.

EXEMPLARY EXAMPLES

In a first exemplary example, a glass was produced by the following consolidation process with no OH doping: (i) heat the body at a temperature of 1030° C. for 1440 minutes during the first thermal treatment such that the consolidation furnace was at a partial steam pressure of 0 atm, (ii) increase the temperature from 1030° C. to 1150° C. at a rate of 50° C. during the ramp-up step such that the consolidation furnace was at a partial steam pressure of 0 atm, and (iii) heat the body at a temperature of 1150° C. for 1440 minutes during the second thermal treatment such that the consolidation furnace was at a partial steam pressure of 0 atm. The resultant body (after annealing step 140 of process 100) was then segmented into a plurality of segments across a 127 mm×127 mm cross-section of the body. Each segment had a length (L") and a width (W") of 12.7 mm and a height (h') of 7.62 mm. An average hydroxyl of the plurality of segments was 135 ppm and a maximum hydroxyl concentration of the plurality of segments was 155 ppm. Furthermore, a P-V hydroxyl concentration of the plurality of segments was 40 ppm.

In a second exemplary example, a glass was produced by the following consolidation process with a steam doping process: (i) heat the body at a temperature of 1030° C. for 1440 minutes during the first thermal treatment such that the consolidation furnace was at a partial steam pressure of 0.33 atm, (ii) increase the temperature from 1030° C. to 1125° C. at a rate of 50° C. during the ramp-up step such that the consolidation furnace was at a partial steam pressure of 0.33 atm, and (iii) heat the body at a temperature of 1125° C. for 1440 minutes during the second thermal treatment such that the consolidation furnace was at a partial steam pressure of 0.33 atm. The resultant body (after annealing step 140 of process 100) was then segmented into a plurality of segments across a 127 mm×127 mm cross-section of the body. Each segment had a length (L") and a width (W") of 12.7 mm and a height (h') of 7.62 mm. An average hydroxyl of the plurality of segments was 800 ppm and a maximum hydroxyl concentration of the plurality of segments was 835 ppm. Furthermore, a P-V hydroxyl concentration of the plurality of segments was 60 ppm.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A process of forming a titania-silica glass body, the process comprising:

exposing a titania-silica soot body to a first thermal treatment by heating the body to a first temperature T1 between about 800° C. and about 1100° C. for a first time duration t1 calculated using the equation:

$$t1 > \frac{L_c^2}{4\alpha}$$

wherein $L_c$ is a length (cm) of the body and a is the thermal diffusivity (cm$^2$/sec) of the body;

increasing the temperature of the body from the first temperature T1 to a second temperature T2 at a rate of about 20° C./hour or greater; and exposing the body to a second thermal treatment by heating the body at the second temperature T2 between about 1050° C. and about 1250° C. for a second time duration t2 such that the second temperature T2 is greater than the first temperature T1, wherein, after the second thermal treatment, a peak-to-valley difference of hydroxyl concentration amongst a plurality of segments of the body is about 70 ppm or less, the hydroxyl concentration being measured using a Fourier transform infrared spectroscopy in transmission, and the plurality of segments includes every adjacent segment across a specific length and a specific width of the body, the specific length being about 25 mm or more and the specific width being about 25 mm or more.

2. The process of claim 1, wherein the peak-to-valley difference of hydroxyl concentration is about 60 ppm or less.

3. The process of claim 1, wherein the peak-to-valley difference of hydroxyl concentration is about 50 ppm or less.

4. The process of claim 1, wherein the thermal diffusivity $\alpha$ is 0.003 cm$^2$/sec.

5. The process of claim 1, wherein, after the second thermal treatment step, the body has a silica concentration of about 80 wt. % or more.

6. The process of claim 1, wherein after the second thermal treatment, the body has a titania concentration from about 6.0 wt. % to about 12.0 wt. %.

7. The process of claim 1, wherein the rate is about 30° C./hour or greater.

8. The process of claim 7, wherein the rate is about 45° C./hour or greater.

9. The process of claim 1, wherein the rate is from about 30° C./hour to about 100° C./hour.

10. The process of claim 1, wherein the specific length is about 50 mm or more and the specific width is about 50 mm or more.

11. The process of claim 10, wherein the specific length is about 100 mm or more and the specific width is about 100 mm or more.

12. The process of claim 1, further comprising, during at least one of the first thermal treatment and the second thermal treatment, exposing the body to an atmosphere having a partial pressure of about 0.50 atm or less.

13. The process of claim 12, wherein the partial pressure is about 0.20 atm or less.

14. The process of claim 13, wherein the partial pressure is less than about 0.02 atm.

15. The process of claim 14, wherein the atmosphere is substantially free of water and steam.

16. The process of claim 1, further comprising, during at least one of the first thermal treatment and the second thermal treatment, exposing the body to an atmosphere comprising steam and having a partial steam pressure from about 0.10 atm to about 1.00 atm.

17. The process of claim 1, further comprising, during the second thermal treatment, exposing the body to an atmosphere comprising steam and having partial steam pressure of about 0.10 atm or less.

18. The process of claim 17, wherein the body is not exposed to steam during the first thermal treatment and during a hold-time $t_{hold}$ during the second thermal treatment, and the body is exposed to an atmosphere comprising steam during the second thermal treatment for a time $t_{rem}$, the time $t_{rem}$ being the remainder of the second thermal treatment after the hold-time $t_{hold}$, and the hold-time $t_{hold}$ being greater than or equal to the first time duration tl of the first thermal treatment.

19. The process of claim 1, wherein the average hydroxyl concentration of the plurality of segments is about 1500 ppm or less.

* * * * *